(12) United States Patent
Eshghi et al.

(10) Patent No.: US 6,944,660 B2
(45) Date of Patent: Sep. 13, 2005

(54) SYSTEM AND METHOD FOR MONITORING BROWSER EVENT ACTIVITIES

(75) Inventors: Kave Eshghi, Los Altos, CA (US); Jerremy Holland, Los Altos, CA (US); John Green, Rocklin, CA (US); Dennis Morgan, Auburn, CA (US); Anupriya Ramraj, Sacramento, CA (US); Steve Smead, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 773 days.

(21) Appl. No.: 09/848,216

(22) Filed: May 4, 2001

(65) Prior Publication Data

US 2002/0165954 A1 Nov. 7, 2002

(51) Int. Cl.[7] ............................................. G06F 13/00
(52) U.S. Cl. ...................................................... 709/224
(58) Field of Search .............................. 705/3, 32, 418; 709/200, 202, 203, 219, 224

(56) References Cited

U.S. PATENT DOCUMENTS 6,112,240 A * 8/2000 Pogue et al. ................. 709/224

* cited by examiner

Primary Examiner—Robert B. Harrell

(57) ABSTRACT

The present invention is directed toward providing a system for monitoring events occurring on a networked browser while the browser is processing web page-based transactions and information, wherein the data from the monitoring process is sent to a computer other than the browser on which the transactions are executing and other than the computer from which the transaction was downloaded. Exemplary embodiments of the invention are directed toward a system and method for invoking a monitoring function on a network computer, including the steps of accessing a web page from a web server, updating the web page by inserting a script tag in the web page, wherein the script tag includes location information for a function for monitoring events on a network computer other than the web server, and storing the updated web page on the web server. An alternate embodiment is directed toward a system and method for monitoring events on a network computer, including the steps of downloading a web page from a web server to a client browser within a network, wherein the web page includes a script tag identifying a location of a monitoring function; retrieving the monitoring function based on information in the script tag; invoking the monitoring function to monitor an event on the client browser; and sending monitored data to a measurement computer, wherein the measurement computer is a computer other than the web server.

17 Claims, 3 Drawing Sheets

SYSTEM AND METHOD FOR MONITORING BROWSER EVENT ACTIVITIES

BACKGROUND OF THE INVENTION

1. Field of the Invention

The present invention relates generally to monitoring computer-based transactions, and more particularly, to monitoring events occurring on a network computer remote from a monitoring computer.

2. Background Information

In today's environment of networked computers, high speed communication connections, and a multitude of Internet resources, network users require ever shorter response times to increasingly complex online transactions. Today's network users demand almost instantaneous response to their queries, whether the requested transaction is a complex search on a multi-million line database or an online loan request that requires a credit check and verification against bank lending standards.

Users who experience what they consider unreasonably slow response times to their online queries are not likely to be satisfied with their use of a particular online transaction or web site and are less likely to return to the transaction or site, especially if alternate resources and sites are available. Correspondingly, online transaction developers are driven to streamline their transactions, not only to please their end users and encourage their return usage but also to minimize unnecessary overhead within each transaction, thousands of which may be occurring at any given moment. Transaction developers and developers of network components attempt to monitor the performance of their network transactions and components in actual usage to best determine whether their efforts toward efficiently streamlining their products have been effective.

Various techniques have been adopted in the past to monitor activities on computers, all with varying amounts of success. For example, Microsoft has developed Browser Helper Objects, which are a particular type of ActiveX® components, that can be adopted for monitoring purposes in Microsoft's Internet Explorer browser. (ActiveX® is a registered trademark of Microsoft Corporation, Redmond, Wash.). However, utilization of ActiveX® routines requires these executable routines be downloaded permanently onto a user's browser and further requires the user's affirmative response to a prompt requesting authorization to install the software. If the user declines, the activity of targeted web-based pages and transactions cannot be monitored, and the developer of such pages and transactions is limited regarding the amount of relevant data that can be recorded and evaluated to improve performance.

Developers have also coded and inserted monitoring applets within web pages to run on user browsers to monitor the performance of the browser while the pages are active on the browser. However, such applets generally can measure performance events only within the page in which the applet was embedded and therefore have limited value monitoring such browser-level events as navigating to a new page or page access aborts. Furthermore, because of limitations in browser technology, any data gleaned during these page applet-based monitoring functions can only be sent back to the web server originating the web page. Such a limitation imposes additional network communications load between the browser and the web server and adds processing load to the web server that must receive and somehow process the monitoring data. Additionally, should the web server go down or should the connection between the browser and the web server be lost following the download of the page to the browser, any monitoring data will likely be lost.

Accordingly, it would be desirable to provide a system and method for monitoring specific, performance-related events on users' networked computers, wherein the monitoring can be accomplished without interfering with the actual user transactions and wherein the evaluation of the monitored events can be performed with minimal impact on the processing and the communications of the networked computers and wherein the system automatically effects changes to improve computer performance without user input.

SUMMARY OF THE INVENTION

The present invention is directed to a system for monitoring events occurring while web-based pages are processing on a network computer, wherein data from the monitoring process can be sent to a computer other than the browser on which the pages are executing and other than the computer from which the pages were downloaded. Since monitoring is done on the browser, user-level performance information is accurately captured and can be accomplished in a manner which can be (but need not be) transparent to the user. Exemplary embodiments are directed toward a system and method for invoking a monitoring function on a network computer, including the steps of accessing a web page from a web server; updating the web page by inserting a script tag in the web page, wherein the script tag includes location information for a function for monitoring events on a network computer other than the web server; and storing an updated web page on the web server.

In exemplary embodiments, the script tag can include a link to a file comprising monitoring instructions.

An alternative embodiment of the present invention is directed to a system and method for monitoring events on a network computer, including downloading a web page from a web server to a client browser within a network, wherein the web page includes a script tag identifying a location of a monitoring function; retrieving the monitoring function based on information in the script tag; invoking the monitoring function to monitor an event on the client browser; and sending monitored data to a measurement computer, wherein the measurement computer is a computer other than the web server.

In exemplary embodiments, the monitoring functions include calculating data associated with the processing of web pages during a client browser session. The monitored data includes at least one of page access start time, page load time, page unload time, page URL being navigated from, page URL being navigated to, page access aborts, query string being passed to the page being navigated to, network connection type, time zone in which the client browser is located, and operating system under which the client browser is executing. The monitored data is stored and evaluated on the measurement computer independently from the processing of the web page on the client browser, and the monitoring function is performed without authorization from the client browser.

A further embodiment is directed to a system and method for dynamically monitoring network performance on a browser, including capturing a start time of a browser navigating to a page across a network; calculating an elapsed time from the start time to a current browser system time; determining whether the elapsed time has exceeded a predetermined maximum elapsed time; and initiating navigation to an alternate web server when the elapsed time has exceeded the predetermined maximum.

In exemplary embodiments, the dynamic monitoring includes terminating navigation to the page by generating a navigation failure record, wherein the navigation failure record includes navigation start time, navigation termination time, page name and location, and an identifier of the web server to which navigation was terminated.

BRIEF DESCRIPTION OF THE DRAWINGS

These and other objects and advantages of the present invention will become more apparent and more readily appreciated to those skilled in the art upon reading the following detailed description of the preferred embodiments, taken in conjunction with the accompanying drawings, wherein like reference numerals have been used to designate like elements, and wherein.

DETAILED DESCRIPTION OF THE PREFERRED EMBODIMENTS

Figure 1:
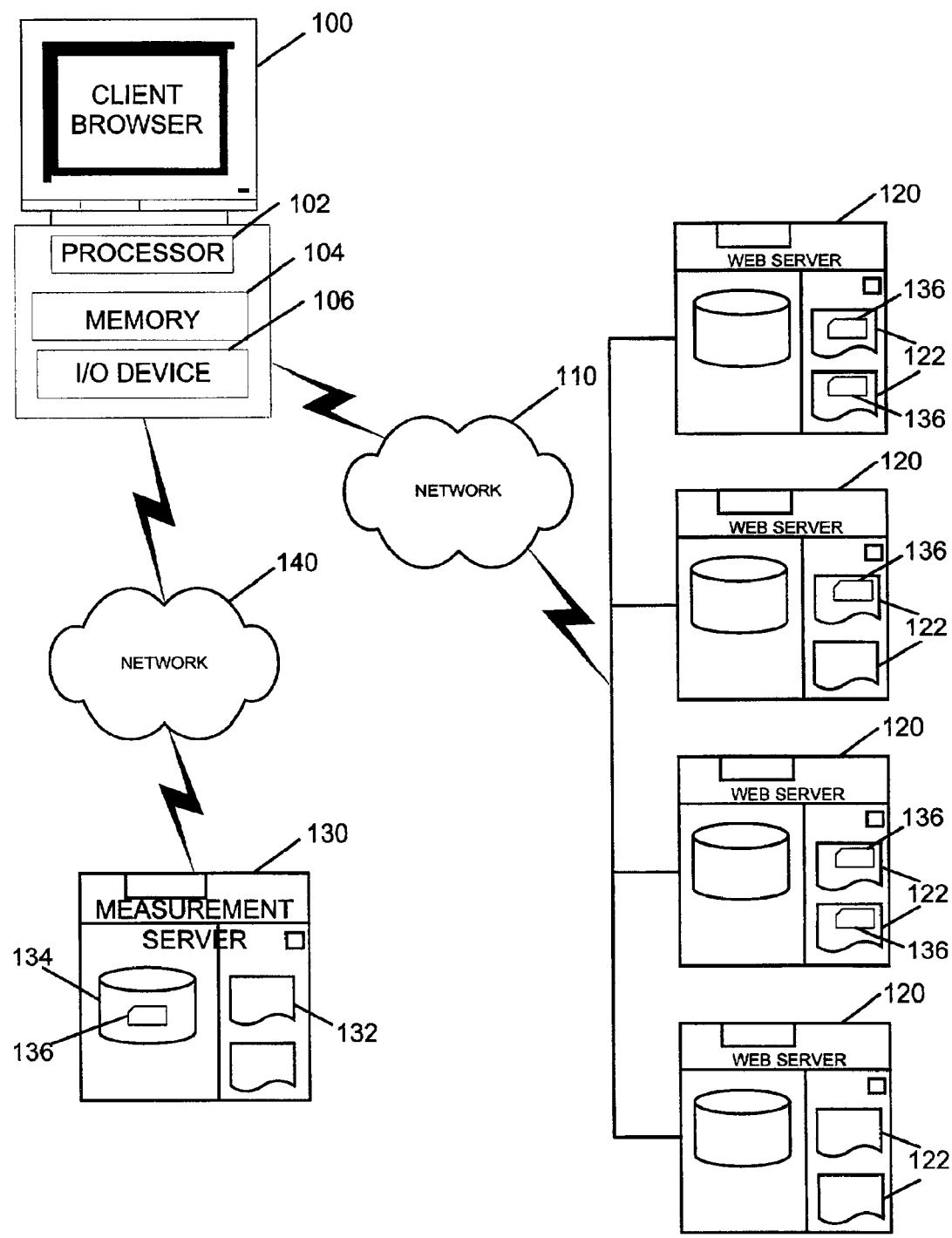
FIG. 1 shows a component diagram of an events-based monitoring system configured in accordance with an exemplary embodiment of the present invention.

Referring initially to FIG. 1, there is shown a component diagram of a system for monitoring events occurring on a user's computer 100 while processing pages 122 downloaded from one or more servers 120 via a network 110. To distinguish the user's computer 100 from the other various computers connected through the networks 110 and 140 of the present invention, the present application will refer to the individual user computer 100 as a client browser 100. While only one such client browser 100 is shown in FIG. 1, any number of users can simultaneously access the present system through multiple client browsers 100. The client browser 100 further includes a processor 102, a memory 104, and an I/O device 106 for use in retrieving and transmitting various features and data available across the networks 110 and 140. Although a single processor 102, memory 104, and I/O device 106 are shown in FIG. 1, and each such element is shown as being internal to the client browser 100, the function of the present invention is not so limited. The present client browser 100 can work equally well with multiple processors 102, multiple memories 104, and multiple I/O devices 106, none of which need be physically resident within the client browser 100.

The networks 110 and 140 may be either private, such as corporate intranets; public, such as the Internet; local area networks (LAN's); wide area networks (WAN's); or any combination thereof. As is well known in the art, web pages 122 to be invoked by a client browser 100 are stored on web servers 120, waiting to be called by any number of computers 100 across a network 110. Of course, web servers can function as client browsers and vice versa.

Each web page 122 accessed by and downloaded to a client browser 100 can contain one or more frames, typically encased and delivered to the client browser 100 as a frame set. Each such page 122 and frame can provide any number of desired transactions and/or information for the user operating the client browser 100. Within the spirit of the present invention, the events occurring on any and all client browsers 100 can be monitored, with the results of the monitoring transmitted from the client browser 100 to a network computer or server 130 other than the web server 120 that originated the pages 122 to the browser 100. While the network 140 through which the client browser 100 communicates with the measurement server 130 is typically the same network 110 through which the client browser 100 accesses web pages 122 on the web servers 120, the present invention will function equally well across multiple networks, 110 and 140.

Exemplary embodiments of the present invention can provide real time monitoring of events occurring on client browsers 100 as the browsers 100 process transactions and information accessed through pages 122 obtained from various web servers 120, for subsequent evaluation and possible browser 100 navigation performance enhancement. Exemplary embodiments can also perform the monitoring, storage, and evaluation of the browser event data without impacting the performance of or load on the web servers 120. Additionally, exemplary embodiments can be configured with the ability, if desired, to monitor the operation of network browsers 100 that are outside the ownership or management control of the particular monitoring entity. For example, monitoring routines can be invoked through web pages 122 built by company A on a network server 120. An unrelated party, B, can access the web pages 120 and execute the web page transactions on B's browser 100, with the browser event data being uploaded to a measurement computer 130 under the control or management of company C, all without increasing the load on the web server 120. The invention permits remote monitoring on any networked browser 100 containing a JavaScript script engine, including both Microsoft Explorer and Netscape Navigator.

Figure 2:
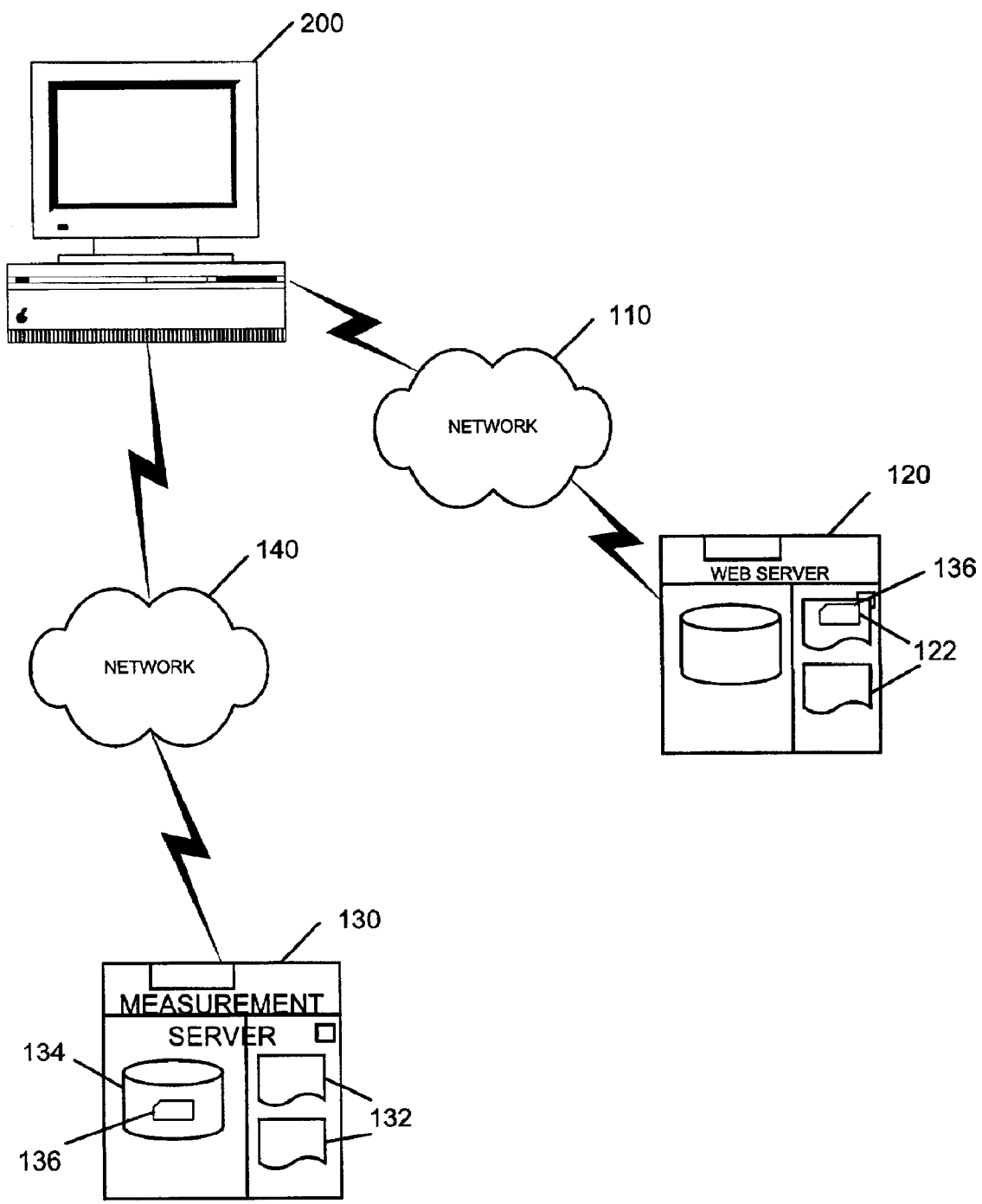
FIG. 2 shows a component diagram of a system for installing script tags within web pages for triggering monitoring functions within networked computers that access those web pages.

FIG. 2 shows a component diagram of a system invoking a monitoring function on a client browser 100 of FIG. 1 within a network 110 in accordance with an exemplary embodiment of the present invention. Referring now to both FIGS. 1 and 2, the process of invoking a monitoring function within the embodiments of th present invention commences with the identification of various web pages 122 that a web age owner or manager desires to be utilized to trigger the monitoring of events on any client browser 100 that accesses the pages 122. The web page owner, manager, or any other party authorized to modify, or update, particular web pages 122 on a given web server 120 utilizes a network computer 200 to access and download the desired pages 122 across the network 110 from the web server 120. In broad terms, the party effecting the page modification updates the web page 122 by inserting a script tag 136 in the web page 122, wherein the script tag 136 includes location information for a function for monitoring events on a network computer 100 other than the web server 120; and stores the updated web page 122 on the web server 120. The inserted script tag 136 can take the exemplary form of:

{{script SRC="WEBmonitor/scripts/WEBscript.js"

LANGUAGE="JavaScript1.2"}}{{/script}} where "WEBmonitor/scripts" is the URL of the directory on a server 130 where the monitoring routine files 134 are stored and where "WEBscript.js" is the file within the "WEBmonitor/scripts" directory containing the script tag 136 that is to e inserted in each web page 122, controlling the monitoring functions of the browser 100 once the web page 122 is accessed by the browser 100. The conventional delimiters of "<" and ">" have been replaced herein by the respective delimiters "{{" and "}}" to avoid the placement of potentially executable code or hyperlinks within the present application The script tag 136 to be inserted in the web page 122 is either accessed from the server 130 or is built by the party modifying the web pages 122. In this manner, the monitoring of the events on the browser 100 can be controlled remotely based on the web page 122 that is accessed and processed by the browser 100. Typically the directory storing the event monitoring functions and the script files is on the measurement server 130, but the directory could be located on any server accessible to the computer 200 being utilized by the authorized party without detracting from the inventive features of the present system. Once the script tag 136 is inserted in the web page 122, the page 122 is uploaded and stored onto the web server 120. In one embodiment of the present invention, the web page 122 is stored on multiple servers 120, with a unique identifier for each such server 120 being stored in a configuration file, the configuration file being stored on the same server 130 as the monitoring routine files 134, for use in an exemplary embodiment of the present invention.

Figure 3:
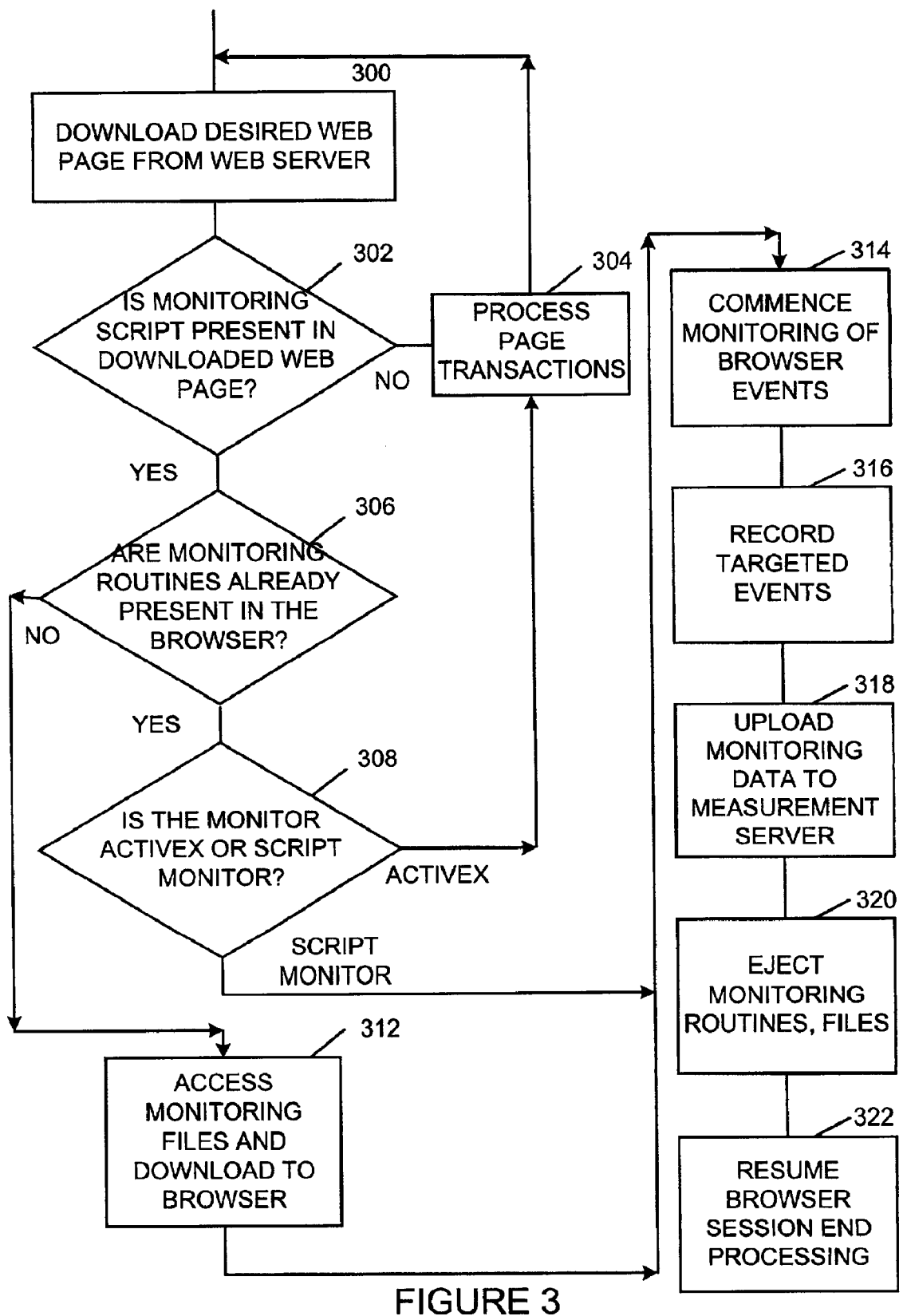
FIG. 3 shows a block flow chart of an exemplary method for monitoring page-related events occurring on a client browser.

FIG. 3 shows a block flow chart of an exemplary process for monitoring page-related events occurring on a client browser 100 while one or more pages downloaded from one or more web servers 120 are processed on the browser 120. Referring now to both the component diagram of FIG. 1 and the flow chart of FIG. 3, the details of an exemplary browser events monitoring process of the present inventive system will be disclosed. A user (web client) operating a browser 100 connected to a network 110 invokes the client browser 100 to access network features, including Internet web sites, web servers 120, and web pages 122, available to the user. Through the browser 100, the user can, for example, enter the Universal Resource Locator (URL) of a desired web site, and the processor 102 initiates an inquiry across the network 110 to locate the network web server 120 containing the web page 122 of the desired site.

Upon the desired web page 122 being located, the processor 102 downloads the web page 122 from the web server 120 to the client browser 100 across the network 110 and into memory 104 at step 300. The web page 122 can, for example be comprised of one or more frames of executable script, blocks of code in Dynamic Hypertext Markup Language (DHTML), or any other blocks of code, each of which can include one or more transactions or files of information to actually perform the processing or function desired by the user. The network 110 can be a local network (LAN) or a wide area network (WAN), such as the Internet; and the network may be private or public. Furthermore, the browser 100 may access the network 110 through a firewall to control the access, in both directions, of transactions and information available across the network 110.

Upon invoking a downloaded web page 122 at the client browser 100, the processor 102 first determines at step 302 whether a script tag 136 is included in the downloaded page 122, wherein such a script tag 136 would include location information for a function for monitoring events on the browser 100 such that the browser 100 is a computer other than the web server 120 originating the web page 122. If no monitoring script tag 136 is found, normal processing of the page 122 on the browser 100 occurs at step 304.

If a script tag 136 is encountered, the tag 136 is read by the processor 102 of the browser 100, and the processor 102 checks at step 306 whether any monitoring functions have already been installed in the memory 104 of the browser 100. If monitoring functions are found to already be resident within the browser 100, the processor 102 checks at step 308 to determine whether the monitoring functions are those of the present inventive system or those of an ActiveX® protocol. If ActiveX® monitoring routines are determined to be resident in the browser, browser processing continues at step 304, but with the ActiveX® monitoring routines in effect. Otherwise, the system proceeds to step 312, where the processor 102 accesses the server 130 identified by its URL in the script tag 136 as holding the script file and monitoring files and retrieves the files, including the monitoring functions, as a hyper-text markup language (HTML) page into the browser 100. The retrieved files are stored in memory 104 and include a configuration file that includes lists of unique identifiers of web servers 120 that house various desired web pages 122. The lists of server identifiers are utilized in a navigation performance enhancement feature that permits timely, dynamic renavigation to multiple web servers 120 to access a desired web page regardless of network 110 load or individual server 120 integrity.

On the browser 100, the processor 102 reloads, or wraps, the downloaded web page 122 inside an invisible, top-level monitoring frame within memory 104 in which the monitoring script and monitoring frames are loaded into an outer, transparent frame. In exemplary embodiments, the outer frame is persistent in that it remains resident in the browser 100, along with the monitoring script and files, during the page-associated browser session. Control is passed back to the browser 100 and the processor 102 for processing the features and information of the downloaded web page 122.

As various events occur on the browser 100, the processor 102 invokes the monitoring functions to detect and monitor the events on the client browser 100 at step 314 and to record data associated with the monitoring of targeted events at 316. Although the monitoring functions can be processed by any number of processors and routines operating on the client browser 100, for the sake of simplicity, the processor responsible for invoking the monitoring functions is represented in FIG. 1 as the single processor 102. Once data is captured or recorded by the monitoring functions, the monitored data is available for being uploaded, or sent, to the measurement server 130 by the I/O device 106 for subsequent analysis, where the measurement server 130 is a computer other than the web server 120 which originated the web page 122. In this manner, the actual monitoring being fulfilled on the client browser 100 is not only transparent to the user but also outside the control of the user.

While the I/O device 106 is represented as a single element in FIG. 1, the present monitoring system will function equally well if the read and write functions of the system were housed in separate read and write devices. As can be seen from FIG. 1, the I/O device 106 can connect to both networks 110 and 140. A single I/O device 106 can be implemented within the present client browser 100 to initiate and process input and output functions across all networks 110 and 140 accessible to the browser 100. Alternatively, separate I/O devices 106 can be available to the browser 100 to separately, for example, process input and output transactions and to access the various networks 110 and 140. Furthermore, the I/O device 106 can have its own processor to direct its read and write functions without detracting from the novel features of the invention.

The monitoring routines of the present invention can remain on the browser 100 during the session invoked by the first downloaded web page 122 containing the inserted script tag 136. Once this session ends, the monitoring routines can be ejected from the browser 100. Through this technique, monitoring routines and monitoring options can be updated on the server 130 storing these files; and, following the update, any subsequent monitoring sessions will utilize the new monitoring routines, options, and files. The monitoring routines and script provide the code not only to fulfill the monitoring but also to detect the events to be monitored on the browser 100.

A single such monitoring session is defined to be the page processing session initiated with the accessing by the browser 100 of a web page 122 containing a monitoring script tag 136. The session continues through all links to other web pages successively invoked from the initial page, whether or not the successive pages also have an inserted script tag 136. Typically, developers will insert the monitoring script tag 136 in the home page of a particular web site so as to maximize the monitoring that can be accomplished while users visit and navigate through the web site. If the browser user enters the URL of a new web site, without utilizing a web page link within the web page 122, the processor 102 will, upon accessing the new web site, terminate the former session and cause any and all buffered monitoring data to be uploaded, or sent, to the measurement server 130 by operation of the I/O device 106 (step 318) and the monitoring functions to be ejected from the browser 100 (step 320). If the new web page 122 contains an inserted monitoring script tag 136, the monitoring process begins again at step 300.

During processing of web page-based transactions on the browser 100, the monitoring routines can detect and record a variety of events (steps 314 and 316), without user knowledge or intervention. One such event and corresponding piece of monitoring data is the name, location, and/or URL of the web page 122 being navigated. This monitoring process commences with the downloading by the processor 102 of the initial web page 122 containing the script tag 136 and the subsequent installation of the monitoring functions in the outer frame in the memory 104 of the user's browser 100. The URL of this web page 122 is captured and retained in memory 104 of the browser 100. Data captured by the monitoring routines of the present invention can be temporarily stored in browser memory 104 by the processor 102 and either buffered for subsequent uploading to the measurement server 130 by the I/O device 106 upon the filling of the buffer or can be retained in the buffer until the end of the session, at which time all the monitored data is uploaded. Alternatively, the monitored data can be sent to the measurement server 130 by the I/O device 106 upon completion of a particular monitoring function.

Since the browser 100 can have multiple frames simultaneously processing, exemplary embodiments use a pending transaction identifier to mark each frame active within the monitoring session. With this identifier, all monitoring data associated with a particular frame can be correlated, such as navigation start and stop time.

Should a link to another page 122 be invoked through the browser 100, whether through the user clicking on a link installed on the present page 122 or through an automatic page call within the present page 122, the processor 102 captures the start time of the browser 100 commencing navigation to the new page 122 across the network 110. This start time is the earlier of the click, or submit, time and the former page unload time. The URL of the requested page 122 is also recorded. If the navigation performance enhancement feature has been selected to be part of the monitoring routine set invoked through the monitoring script tag 136 of the first page 122 containing such a script tag 136, the processor 102 within the browser 100 calculates the elapsed time from the navigation start time to the current system time within the browser 100. During the periodic calculation of the elapsed navigation time, the processor 102 monitors the elapsed navigation time and compares it against a predetermined maximum navigation time. The processor 102 determines whether the calculated elapsed time has exceeded the predetermined maximum elapsed time. If so, the processor 102 triggers the termination of the navigation to the server 120 and retrieves a unique identifier for a new server 120 from a list of renavigation server identifiers in the configuration file that was retrieved as part of the monitoring files and stored in memory 104. Navigation to the desired web page 122 is reinitiated by the processor 102, this time through the name of the server 120 newly retrieved by the processor 102. If navigation to the new server 120 also exceeds the maximum acceptable navigation time, the processor 102 once again terminates navigation, retrieves the next unique server identifier from the list in the configuration file, and initiates navigation to the alternate web server as obtained from the configuration file. This process continues until timely navigation to the desired web page 122 is accomplished or until the end of the server identifier list in memory 104 is reached. Upon encountering the end of the list, the processor 102 either starts over at the top of the server identifier list or else aborts the navigation, with an appropriate error message to the browser user and generation of a navigation failure record. The navigation failure record includes the navigation start time, the navigation termination time, the name and location of the page being navigated to, and an identifier of the web server 122 to which navigation was terminated. Through this navigation enhancement process, the browser 100 is not needlessly locked up trying to access a web page 122 across a network 110 to a particular web server 120 when the network 110 may be down, the server 120 may be down, or activity on either the network 110 or the server 120 may be so heavy as to slow page 122 accesses and downloads.

Each of these access attempts are monitored within the browser 100 and recorded in the form of start times and URL sites. The navigation to a new web page 122 is an example of a two-step monitoring process in which the monitoring data is not complete until the navigation is complete or is aborted, either through a time-out, a user cancel, or a system failure. Upon successful completion of the navigation, the navigation stop time is recorded as the time the desired web page 122 is loaded onto the browser 100. At this time, the page navigation record is complete. Alternatively, the elapsed time can be calculated by the processor 102 as the difference between the stop and start time for the particular URL and can be added to the monitoring record prior to the record being buffered or uploaded to the measurement server 130 by the I/O device 106.

Additional monitoring elements include query strings, which are the entered information and parameters entered by a user to provide information, such as name and address, to a new frame or page 122. The system also captures the operating system, such as Win98/Win NT or HP-UX, and the browser type, such as Microsoft Explorer or Netscape Navigator, under which the browser 100 is operating. Also, the connection type by which the browser 100 is attached to the network 110, such as LAN, WAN, modem, or ISDN, can be recorded. The time zone in which the browser 100 is operating is also recorded by the monitoring system.

Two additional elements which can be determined and recorded by the monitoring system are page aborts and navigation failures. A page abort occurs when navigation to a new web page 122 (whether initiated by the user clicking a link or entering a page URL or by the current page 122 automatically linking to another page 122) is canceled by the user hitting the stop button on the browser 100 or navigating to a new page before the prior page is loaded on the user's browser 100. A navigation failure is defined to be a failure to access and download to the browser 100 the sought web page 122. Navigation failures occur, for example, when the URL of the page 122 is incorrectly entered, when the page 122 no longer exists on the network 110, when the server 120 the page 122 resides on is down, when the network 110 is down, or when the network or server load is so great that the navigation times-out. In circumstances of page aborts and navigation failures as detected by the monitoring routines, the URL of the desired web page 122, the start time of the navigation, and the time of the abort, failure, or corresponding error message to the user at the browser 100 are recorded. The monitoring routines can also insert the elapsed time of the page abort or failed navigation, from start to abort/failure, in the monitoring record. In those circumstances where the navigation performance enhancement feature is active, a navigation failure occurs when the predetermined elapsed navigation time is exceeded, and a corresponding monitoring record is created and stored or uploaded to the measurement server 130, all transparent to and without involvement of the browser user. Furthermore, the monitoring is accomplished automatically and dynamically through a network of connected, but unrelated, computers, each of which can be separate, and therefore remote, from each other.

Upon termination of the session, control in the browser 100 is first passed to the monitoring routines, which check to determine whether any monitoring records have been built but not yet uploaded to the measurement server 130. For such records, the I/O device 106 sends, or uploads, the data to the measurement server 130 for subsequent analysis. For partial records, such as navigation records that have a start time but not a stop time, the current system time is inserted as the stop time and a condition code for the record is set to indicate an abnormal termination. The monitoring routines are ejected, the web page is returned to its original frame structure, and traditional page processing on the browser 100 proceeds at step 322, transparent to the browser user.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A system for monitoring events on a network computer, comprising:
    a processor for downloading a web page from a web server to a client browser within a network, wherein the web page includes a script tag identifying a location of a monitoring function, and for retrieving the monitoring function based on information in the script tag to monitor an event on the client browser; and
    an I/O device for sending monitored data to a measurement computer, wherein the measurement computer is a computer other than the web server, and
    wherein the monitored data includes a start time of the client browser navigating to a new web page across the network, and wherein the processor calculates elapsed time from the start time to a current browser system time, for determining an elapsed time for navigating to the new web page.

2. The system according to claim 1, wherein the monitored data includes at least one of page load time, page unload time, page URL being navigated from, page URL being navigated to, page access aborts, query string being passed to a page being navigated to, network connection type, time zone in which the client browser is located, and operating system under which the client browser is executing.

3. The system according to claim 1, wherein the monitored data is stored and evaluated on the measurement computer independently from processing of the web page on the client browser.

4. The system according to claim 1, wherein the processor calculates data associated with processing of web pages during a client browser session.

5. The system according to claim 1, wherein the processor invokes the monitoring function without authorization from the client browser.

6. The system according to claim 1, wherein, when the calculated elapsed time has exceeded a predetermined maximum elapsed time, the processor initiates navigation to an alternate web server.

7. The system according to claim 6, wherein the processor generates a navigation failure record, wherein the navigation failure record includes navigation start time, navigation end time, page name and location, and an identifier of the web server to which elapsed navigation time was exceeded.

8. The system according to claim 1, wherein the web server, the client browser, and the measurement computer are remote from each other.

9. A method for invoking a monitoring function on a network computer, comprising the steps of:
    accessing a web page from a web server,
    updating the web page by inserting a script tag in the web page, therein said script tag includes location information for a function for monitoring events on a network computer, wherein the location of the function is on a server other than the web server; and
    storing the updated web page on the web server,
    wherein the function can monitor the start time of a page navigation event and the elapsed time from the start time, for determining an elapsed time for navigating to a new web page.

10. The method according to claim 9, wherein the inserted script tag further includes a link to a file comprising monitoring instructions.

11. A method for monitoring events on a network computer, comprising the steps of:
    downloading a web page from a web server to a client browser within a network, wherein the web page includes a script tag identifying a location of a monitoring function;
    retrieving the monitoring function based on information in the script tag;
    invoking the monitoring function to monitor an event on the client browser; and
    sending monitored data to a measurement computer, wherein the measurement computer is a computer other than the web server, and
    wherein the monitored data includes a start time of the client browser navigating to a new web page across the network, and wherein the processor calculates relapsed time from the start time to a current browser time, for determining an elapsed time for navigating to the new web page.

12. The method according to claim 11, where n the monitored data includes at least one of page load time, page unload time, page URL being navigated from, page URL being navigated to, page access aborts, query string being passed to a page being navigated to, network connection type, time zone in which the client browser is located, and operating system under which the client browse is executing.

13. The method according to claim 11, wherein the monitored data is stored and evaluated on the measurement computer independently from processing of the web page on the client browser.

14. The method according to claim 11, wherein the step of invoking the monitoring functions includes calculating performance data associated with the processing of web pages during a client browser session.

15. The method according to claim 11, wherein the step of invoking the monitoring function is performed without authorization from the client browser.

16. The method according to claim 11, comprising the steps of:

determining whether the elapsed time has exceeded a predetermined maximum elapsed time; and initiating navigation to an alternate web server when the elapsed time has exceeded the predetermined maximum.

17. The method according to claim 16, comprising terminating navigation to the page by generating a navigation failure record, wherein the navigation failure record includes navigation start time, navigation termination time, page name and location, and an identifier of the web server to which navigation was terminated.

* * * * *